(12) United States Patent
Elchlepp et al.

(10) Patent No.: US 9,754,196 B2
(45) Date of Patent: Sep. 5, 2017

(54) METHOD AND DEVICE FOR THE MARKLESS CONTROL OR REGULATION OF A DIGITAL PRINTING PROCESS

(71) Applicant: manroland web systems GmbH, Augsburg (DE)

(72) Inventors: Andreas Elchlepp, Aichach (DE); Thomas Eisensteger, Augsburg (DE)

(73) Assignee: manroland web systems GmbH, Augsburg (DE)

(*) Notice: Subject to any disclaimer, the term of this patent is extended or adjusted under 35 U.S.C. 154(b) by 0 days.

(21) Appl. No.: 14/732,485

(22) Filed: Jun. 5, 2015

(65) Prior Publication Data

US 2015/0363676 A1    Dec. 17, 2015

(30) Foreign Application Priority Data

Jun. 13, 2014 (DE) .................. 10 2014 108 325

(51) Int. Cl.
| | |
|---|---|
| *G06F 15/00* | (2006.01) |
| *G06K 15/02* | (2006.01) |
| *B41F 33/00* | (2006.01) |
| *B41F 13/46* | (2006.01) |
| *B41F 13/54* | (2006.01) |
| *B41F 33/16* | (2006.01) |
| *G03G 15/00* | (2006.01) |

(52) U.S. Cl.
CPC .......... *G06K 15/1803* (2013.01); *B41F 13/46* (2013.01); *B41F 13/54* (2013.01); *B41F 33/00* (2013.01); *B41F 33/0009* (2013.01); *B41F 33/0036* (2013.01); *B41F 33/16* (2013.01); *G03G 15/50* (2013.01); *G03G 15/65* (2013.01)

(58) Field of Classification Search
CPC .... G06K 15/1803; G03G 15/50; G03G 15/65; B41F 13/46; B41F 13/54; B41F 33/00; B41F 33/0009; B41F 33/0036
USPC ....................................... 358/1.15
See application file for complete search history.

(56) References Cited

U.S. PATENT DOCUMENTS

| | | |
|---|---|---|
| 5,724,437 A | 3/1998 | Bucher et al. |
| 7,664,294 B2 | 2/2010 | Sacher et al. |

(Continued)

FOREIGN PATENT DOCUMENTS

| | | |
|---|---|---|
| CN | 1586892 A | 3/2005 |
| CN | 101207677 A | 6/2008 |

(Continued)

OTHER PUBLICATIONS

German Search Report dated Aug. 12, 2014, with Statement of Relevancy (Nine (9) pages).

(Continued)

*Primary Examiner* — Mark Milia
(74) *Attorney, Agent, or Firm* — Crowell & Moring LLP (57) ABSTRACT

A method for checking intermediate, part or end products during the production process without using marks is disclosed. The print image of the intermediate, part or end product produced on a digital printing press is scanned at least after a predetermined production step in order to subsequently compare the scanned print image with stored product data. Based on the comparison, the check of the previous processing steps and/or the calculation of the subsequent control actions for the order allocated to the intermediate, part or end product and the control actions by the production device are carried out.

14 Claims, 4 Drawing Sheets

(56) References Cited

U.S. PATENT DOCUMENTS

| | | |
|---|---|---|
| 8,073,239 B1 | 12/2011 | Bahrami et al. |
| 8,559,042 B2 | 10/2013 | Ito |
| 2008/0151307 A1 | 6/2008 | Minamida et al. |
| 2012/0162706 A1 | 6/2012 | Ito |
| 2012/0288298 A1 | 11/2012 | Toriyabe |

FOREIGN PATENT DOCUMENTS

| | | |
|---|---|---|
| CN | 103738060 A | 4/2014 |
| DE | 43 21 177 A1 | 1/1995 |
| DE | 103 19 771 A1 | 11/2004 |
| DE | 10 2005 012 913 A1 | 10/2005 |
| DE | 10 2006 027 067 A1 | 12/2006 |
| DE | 10 2005 061 029 B3 | 5/2007 |
| DE | 10 2005 060 441 A1 | 6/2007 |
| DE | 10 2012 103 679 A1 | 10/2013 |
| EP | 1 167 034 A2 | 1/2002 |
| EP | 1 454 746 A1 | 9/2004 |
| JP | 2004-45228 A | 2/2004 |
| JP | 2012-135948 A | 7/2012 |
| JP | 2013-111946 A | 6/2013 |

OTHER PUBLICATIONS

English translation of Japanese Office Action issued in Japanese counterpart application No. 2015-119117 dated Feb. 15, 2016 (Three (3) pages).

European Search Report issued in European counterpart application No. 15170929.2-1704 dated Nov. 26, 2015, with statement of relevancy (Nine (9) pages).

Chinese-language Office Action issued in counterpart Chinese Application No. 201510321619.7 dated Mar. 31, 2017 with English translation (Twelve (12) pages).

METHOD AND DEVICE FOR THE MARKLESS CONTROL OR REGULATION OF A DIGITAL PRINTING PROCESS

This application claims the priority of German Patent Document No. DE 10 2014 108 325.3, filed Jun. 13, 2014, the disclosure of which is expressly incorporated by reference herein.

BACKGROUND AND SUMMARY OF THE INVENTION

The invention relates to a method for the markless control or regulation of a production process with a production device which can form-variably print the entire substrate or only parts thereof, and to a device for carrying out the method.

In print shops production devices are employed which can completely carry out a given printing order. This comprises the printing of the order, the further processing into the finished product, for example an advertising flyer consisting of a single sheet up to a completely bound book. Furthermore, a logistic system can also be connected to the production devices. Consequently, the term production device does not only comprise the printing device and one or multiple further processing devices, which produce an end product, but can also comprise a logistical system which carries out further processes which arise after the production of the end product.

It can be noted that increasingly production devices are employed in which as printing devices digital printing presses are used, which compared with conventional offset printing presses, are particularly suited for processing a multitude of changing and different printing orders, i.e., that can in principle differently print each individual print copy since they reproduce the image with each individual printing operation. These production devices are called print form-variable production devices or digital printing presses. There is also the combination of a non-print form-variable printing press, e.g., an offset printing press, with a print form-variable printing press. Since with such devices at least a part of the image is print form variable, these devices are likewise termed print form variable.

From practice it is already known that a digital printing press comprises a production planning and production control system, i.e., for example a digital print planning module and a printing press computer in order to plan and control the printing of print orders on the digital printing press.

It is known, furthermore, that in a pre-press stage, i.e., in a production stage located upstream of the actual printing operation, required information—namely so-called print data—are already conditioned to suit the pre-set machine printing conditions and the pre-set printing method and the area coverages and colors are determined accordingly in a digital database. Based on this data, the printing operation is then carried out in a printing press, such as for example an inkjet printing device or a laser printing device and this digital print data is no longer changed during the print production. In the case of digital printing presses, this data is digitally stored as digital print data or imaging data and can be made available to or accessed from the production device throughout the production operation.

It is known, furthermore, that the data of the so-called imposer known to the person skilled in the art can likewise be stored in the production planning and production control system in a suitable format for further processing.

Furthermore, so-called product structure data can be made available and stored. Production structure data is to mean data which substantially define the logical and format-based, i.e., size-based construction of the product, which results from the relevant order. Logical construction of the product is to mean in particular how the product is constituted, i.e., which format it has, which book structure, with which page number, with which collecting operations, which folding versions as well as which further reprocessing steps such as trimming, collecting, combining into book blocks with other sections etc., i.e., which steps have to take place during processing in order to obtain the desired product, i.e., which control actions are required at the further processing machine. Furthermore, content, personalizations of the product as well as logistical information and commercial information according to the order can be covered by this term.

Apart from the product data explicitly mentioned above, i.e., the digital printing data or imaging data, the imposer and/or the product structure data, all further product data required for carrying out an order or for the control or regulation of the production device can be made available.

The product data is preferably stored in a storage device, but is not restricted to this. The product data can be made available in a format that can be directly used or can be converted into a suitable format. The use of storage devices in the region of the printing presses is known. A storage device according to the present invention can comprise any device for storing information. The storage device can be integrated in one of the production devices or be available otherwise, for example via a network connection and corresponding interfaces, and is known from the prior art. The storage device can make available the stored data to other production machines via, for example, interfaces. The data format can also be converted into a format that is suitable for the relevant production machine. The storage device can store any product data made available, such as for example also the imaging, imposing and product structure data and making this available to any of the production devices if required.

It is known, furthermore, that a further processing device, e.g., a cutting, folding, gluing, punching, sectioning, collection, separating and/or stitching device located downstream of the digital printing press has to be activated in order to carry out the correct actions for each order. Up to now, this activation is effected by means of so-called "marks", which during the printing operation are printed onto the individual printing orders, which are printed onto the so-called substrate. In the process, another "mark" is usually required for each action to be carried out by the further processing device.

This method has multiple disadvantages. On the one hand, because of the required space for printing the mark more paper and ink is required since the part of the substrate containing the mark(s) has to be cut off since the customer does not want to have any mark on the finished product. Furthermore, the degree of automation of the production process is restricted since the further processing machine cannot be automatically connected to the data flow of the production planning and production control system. This means among other things that control actions such as, for example, cutting, collecting, folding, gluing, sectioning, perforating, separating, etc., cannot be carried out in the individual sequence for each order without problems, i.e., without marks which are defined before the printing process and then printed on, which slows down the printing process. Furthermore, a quality check by means of the marks is not possible.

The problem of markless further processing of the substrate after it has reached the further processing device from the printing press, is solved in the application submitted parallel to this application. However, this invention does not solve the problem as to how an intermediate, part or end product of an order can be checked without the use of marks in a preferably automated manner, which product has already been subjected to at least one first processing step. Checking in this context means, for example, checking which order is present or should be present in which location of the production process at a certain time, if the quality of the intermediate, part or end product is adequate or which further step for the intermediate, part or end product is provided as well as the automatic transfer to an additional further processing device or a logistical device. Quality in this case is to mean both the quality check as well as the quality assurance. More precisely it is checked, for example, if a product after/before a certain operation looks as it should look according to the stored product data for the relevant order and production step, i.e., for example also if the correct sequence of the production steps was maintained. Quality is to mean also the print and/or fold quality. Intermediate, part and/or end product in this connection is to mean that the substrate is no longer present as web or sheet or in another format coming out of the printing press, but at least one further processing step has already taken place such as for example cutting, folding, collecting and/or stitching.

The method according to the invention is for controlling or regulating a production process with a print form-variable production device, wherein the production process comprises one or multiple orders, wherein for each of these orders corresponding product data for one or multiple production steps of the production device for producing an intermediate, part or end product is stored in a storage device.

The core of the present invention is to make available a preferably automated method for checking intermediate, part and/or end products of an order during the production process without the use of marks. An advantage of a markless production is that paper and ink are saved, by way of which production costs can be lowered and a more environmentally friendly method is made available. Furthermore, by providing and using stored product data, such as for example imaging, imposing and/or product structure data a higher degree of automation with such a method is achieved for each print order, by way of which more flexible production planning is made possible, which leads to a faster production process. Furthermore, a quality check can be automated. Furthermore, a potential error source through faults allocation of mark or code to the respective intermediate, part and/or end product is excluded.

A print form-variable production device according to the present invention can comprise both a printing press with one or multiple integrated further processing devices as well as a printing press and one or further modular, i.e., non-integrated, components which serve as further processing devices. Furthermore, the production device can additionally comprise a logistical device, which for example is positioned after the last further processing device. In the printing press, one or multiple substrate webs or the substrate sheets according to the orders in hand, which are stored in a storage device, are printed and subsequently passed on to one of the further processing devices. A production process in this case comprises multiple orders. Here, each order can differ from the preceding order.

Further processing devices according to the present invention are all devices which make possible further processing of the substrate coming from the printing press, be it as substrate web or as sheet or in any other possible format. These include among other things one or multiple cutting, folding, punching, sectioning, collecting, separating and/or stitching devices or a combination thereof. Further processing is to mean any further processing of the substrate coming out of the printing press, i.e., for example cutting, folding, collecting, gluing, sectioning, perforating, separating, combining, book block binding and/or passing on to the next further processing device, etc. Once one or multiple further processing steps have been carried out, an intermediate, part or end product for an order is available, i.e., the processed order is either completed or has to be further processed. "Further processed" is to mean the respective next step in the production process that is needed in order to complete the order. This also includes steps such as passing on to a device which is no longer part of the production device, for example a logistical device which unites the order coming out of the production device with an order processed in another device into an end product or collects completed orders which are then prepared for transport and dispatched. This means that for each order not only information up to the completion of the order can be made available, stored and processed but also information beyond this, such as for example logistical information.

The scanning device according to the present invention can either be integrated in or in front of at least one following further processing device or in or directly after the further processing device of the production device carrying out the production step or can be made available in modular form. The scanning device scans at least one part of the print image of an at least partly completed order from the production device, i.e., a print image of an order is scanned, with which at least one further processing step was carried out after the substrate breached the further processing device coming out of the printing press, i.e., an intermediate, part or end product is present. The print image to be scanned or scanned differs from the originally printed print image which coming out of the printing press was transferred to the further processing device in the form that in combination of the product data, in particular of original print image or print image data or imaging data, imposition schema, product structure data and the respective (further) processing step already carried out merely definable parts of the print image originally printed onto the substrate, for example the web or the sheet are visible, since an intermediate, part or end product of an order is already present here.

For scanning the still visible part of the print image of each order, different methods and devices can be used dependent on the utilized scanning device. Accordingly, only one or multiple predefined parts of the print image of an order can be scanned for example. Such a part can for example be a predetermined region which comprises the features, e.g., geometrical data that are characteristic for the relevant printing order. Multiple regions can also be scanned at the same time. The regions can for example be individual or multiple webs or trails or predefined regions of the individual order or a combination thereof. The regions can be different for each order. Scanning can be effected with the help of a sensor or another suitable scanning device. The print image can be scanned pixel-accurately or be used in any desired resolution depending on which scanning device is used. Scanning can also be effected by a histogram regarding multiple predefined features being generated, for example by an image or color histogram, which are known from digital photography. One or multiple predetermined features such as, for example, individual colors or multiple colors, among them also white and black can also be scanned. A combination of, for example, the color scanning for a region and a pixel-accurate scanning for a further region can also take place. This can be advantageous, for example, for scanning book pages which differ mainly in the page numbering. The scanning possibilities described here however are not restricted. On the contrary, any method for scanning the print image can be used for as long as it satisfies the requirements in terms of the required information, i.e., for example resolution. Methods such as photographing or scanning by lines of the print image known from image processing are also conceivable here.

Once the scanning device has scanned the remaining print image, the scanned print image is compared with the product data known for each order and each production step and already stored for the printing in order to assign the order belonging to the print image and allocate the associated intermediate, part and/or end product. The comparison is carried out by known comparison devices and is dependent on how the print image was scanned. An image-image comparison can take place, for example, during which the remaining print image is compared with the imaging data in combination with at least imposition schema and production structure data. However, the histogram can also be compared with the imaging data in combination with at least imposition schema and product structure data when these are present in the same format or are converted into the same. The comparison is also dependent on the computer capacity and the data to be compared and is selected so that high efficiency and the required accuracy are achieved.

Once the relevant intermediate, part and/or end product and thus the relevant order has been assigned to the respective scanned print image, a check of the previous processing steps and/or a calculation of the following control actions needed for the further processing of the order is carried out from this comparison. The calculated control actions are carried out by the relevant responsible further processing device.

The intermediate, part or end product that is characteristic for each process step of an order is created out of a combination of the product data made available, for example of a combination of the imaging data or digital print data, the imposer and/or the product structure data of an order. This means that based on the intermediate, part or end product it is known at any time in the process sequence how the order has to look at this point. It is known, for example, via the product data and the thus known intermediate, part or end product which image or which page of the order, for example, has to lie at the top after a certain production step has been carried out. This is possible since from the product data the process sequence, for example, printing, cutting, perforating, collecting, stitching, separating is known and it can be calculated which image, for example, has to lie on the top following collecting, i.e., which intermediate, part or end product is expected so that the next step, i.e., stitching, can be activated. Thus, the associated order can be allocated by comparing the scanned print image with the product data provided for the corresponding production step and the command for executing the further production step passed on and carried out.

Following control actions can be any actions which arise following the production of the intermediate, part or end product according to the respective order. This can, for example, be further process and/or logistical steps.

Further process and/or logistical steps can, for example, comprise the completing of an order, the uniting of multiple orders, the qualitative or quantitative checking of the intermediate, part or end product as well as the passing on to a following device such as, for example, a transport device as well as tracing, but are not restricted to this listing.

Furthermore, a print form-variable device is made available according to the present invention which carries out the method described above. This device comprises at least the devices described above for the method, such as for example a printing press, a scanning device, a storage device and a further processing device. Further devices which are needed in order to carry out a printing process with a print form-variable production device are known to the person skilled in the art and are not mentioned here.

The one or multiple scanning devices of the device can be positioned both in or in front of the further processing device which performs the next production step so that checking the preceding production step takes place only just before the further processing in the next step.

The one or multiple scanning devices of the device however can also be positioned in or directly after the further processing device so that checking the production step carried out by this further processing device takes place directly after the production step has been carried out.

Furthermore, a combination of the aforementioned possibilities of positioning the scanning device can also take place.

Positioning the scanning device is dependent on various factors. Such factors can, for example, be: space reasons in the setting up of the production device, customer requests, requirements of the production process, etc.

The arrangement of the scanning device in front of or in the further processing device is advantageous when the preceding production step is, for example, critical to quality and a (prolonged) transport to the next further processing device is needed so that the check advantageously takes place only after the transport in order to exclude a reduction of quality caused by the transport.

The arrangement of the scanning device in or after the processing device is advantageous when the further processing device is, for example, the last processing device since in this case a check can be performed immediately after completion of the production step, or the scanning device is combined with the further processing device into one device.

Furthermore, it is not determined within a production device that each of the scanning devices is positioned in, in front of, or after the respective further processing device. It is rather possible, for example, that with a further processing device the scanning device is positioned in or in front of the same in order to scan and check the preceding production step, and a further scanning device is positioned in or after the same further processing device in order to scan and check the production step carried out there. This can apply to all further processing devices of a production device but is not fixed to the same. Each individual processing device can rather be made according to the production requirements.

In the following, the invention is explained in more detail with the help of the attached drawings which constitutes merely one exemplary embodiment.

DETAILED DESCRIPTION OF THE DRAWINGS

Figure 1:
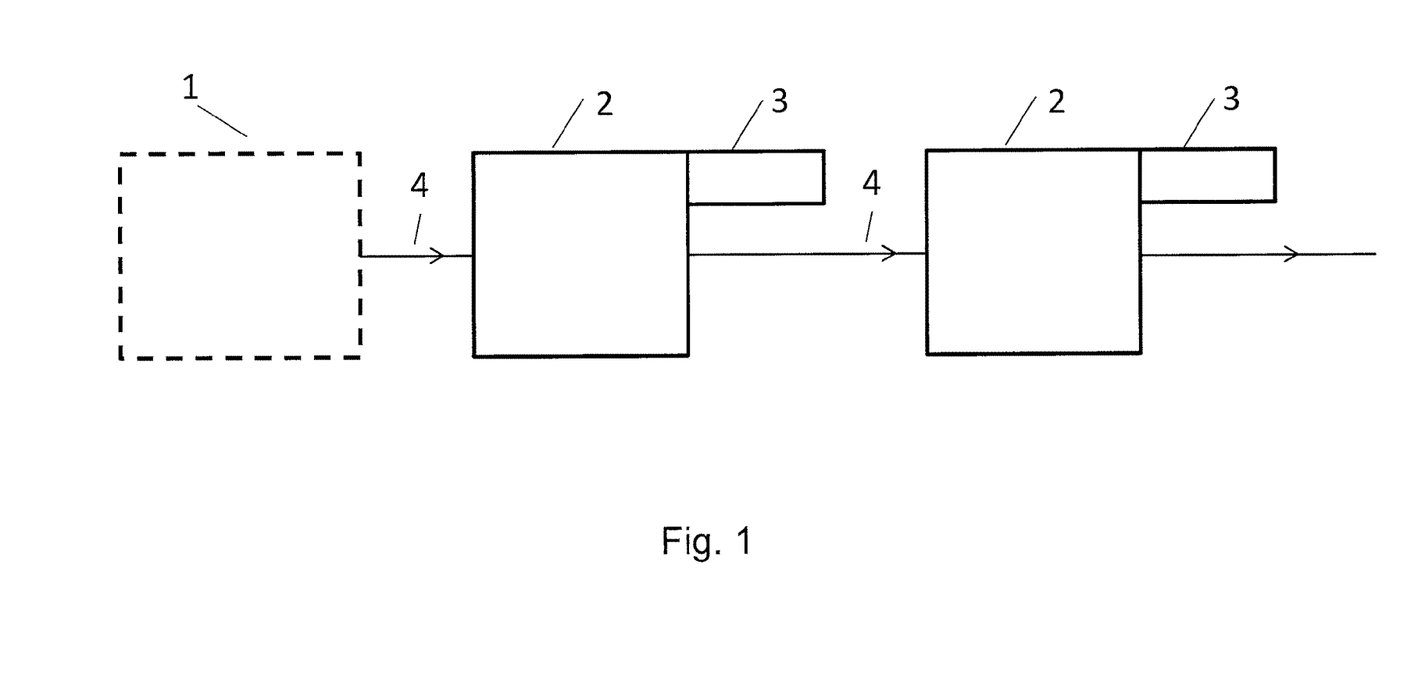
FIG. 1 is a fundamental construction of a production device with a printing press having multiple integrated further processing devices and a scanning device positioned after each of the further processing devices.

Exemplarily shown and described with reference to FIG. 1 is a production device with a printing press 1 having two integrated further processing devices 2. In addition, FIG. 1 shows a scanning device 3 arranged after each of the further processing devices 2, which scans a print image of an intermediate, part or end product as described above so that it can be compared with the stored product data regarding the respective production step performed and the check and/or calculation of the further control actions described above can then take place.

Figure 2:
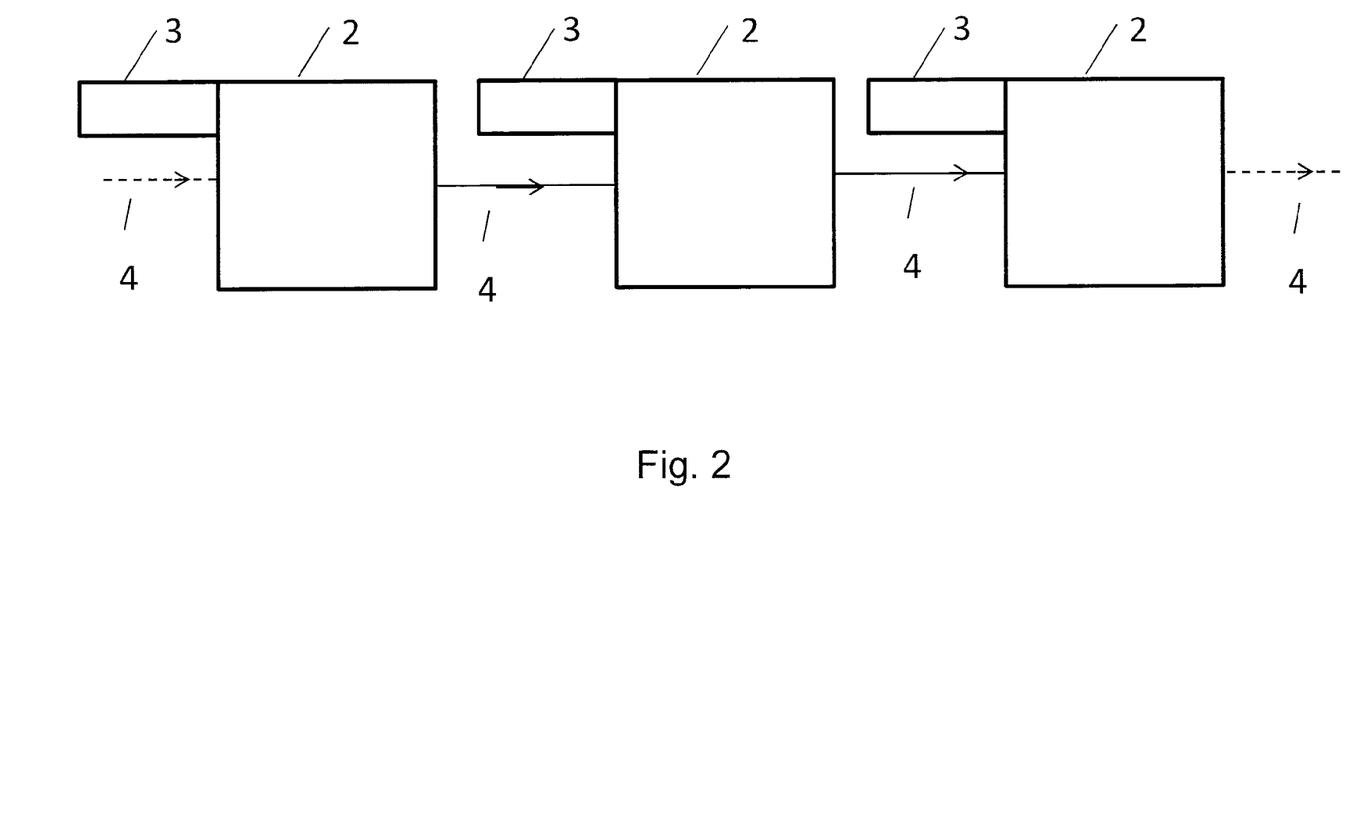
FIG. 2 is a fundamental construction of a production device having multiple integrated further processing devices and a scanning device positioned in front of each of the further processing devices.

Exemplarily shown and described with reference to FIG. 2 is a section of a production device in which in front of each of the further processing devices 2 a scanning device 3 is positioned, which senses a print image of an intermediate, part or end product as described above so that it can be compared with the stored product data regarding the respective production step carried out and the check and/or calculation of the further control actions described above can then take place.

Figure 3:
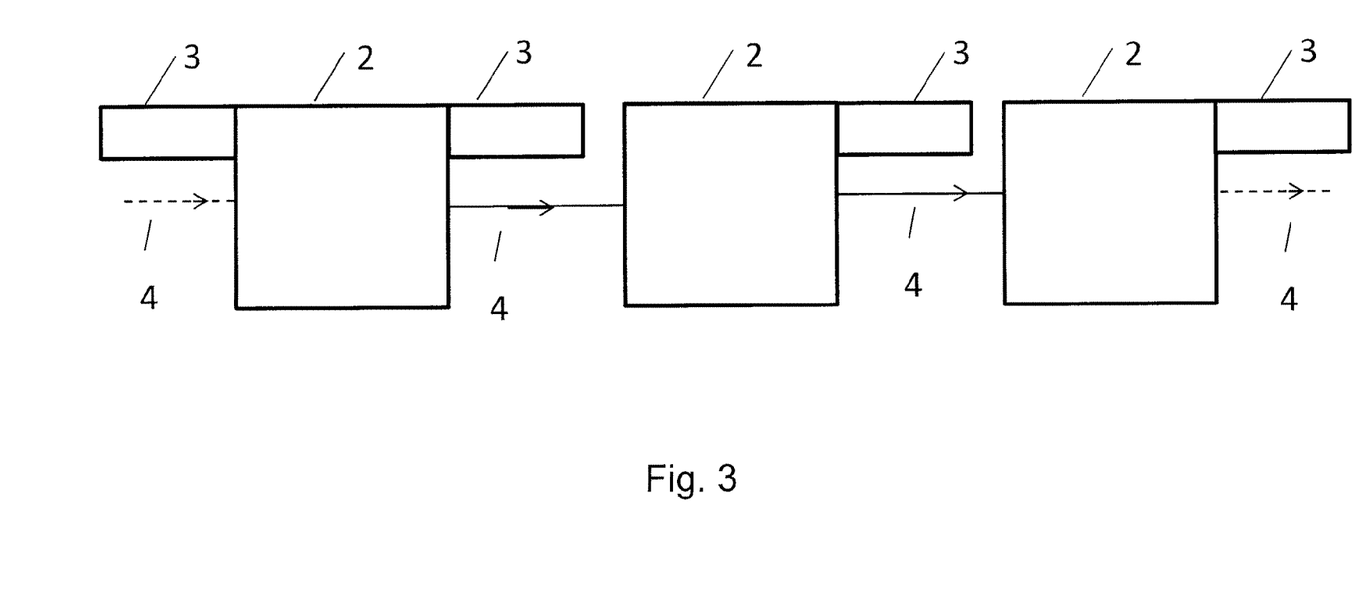
FIG. 3 is a fundamental construction of a production device having multiple integrated further processing devices, wherein with one of the further processing devices a scanning device is positioned in front of and a scanning device after the further processing device, and with the additional further processing device the scanning device is positioned after the respective further processing device.

Exemplarily shown and described with reference to FIG. 3 is a section of a production device in which the production device is constructed in such a manner that at least with one of the further processing devices 2 a scanning device 3 is positioned in front of and a scanning device 3 after one of the further processing devices 2, and with additional further processing devices 2 the scanning device 3 is positioned after the respective further processing device 2, so that a print image of an intermediate, part or end product can be scanned as described above.

Figure 4:
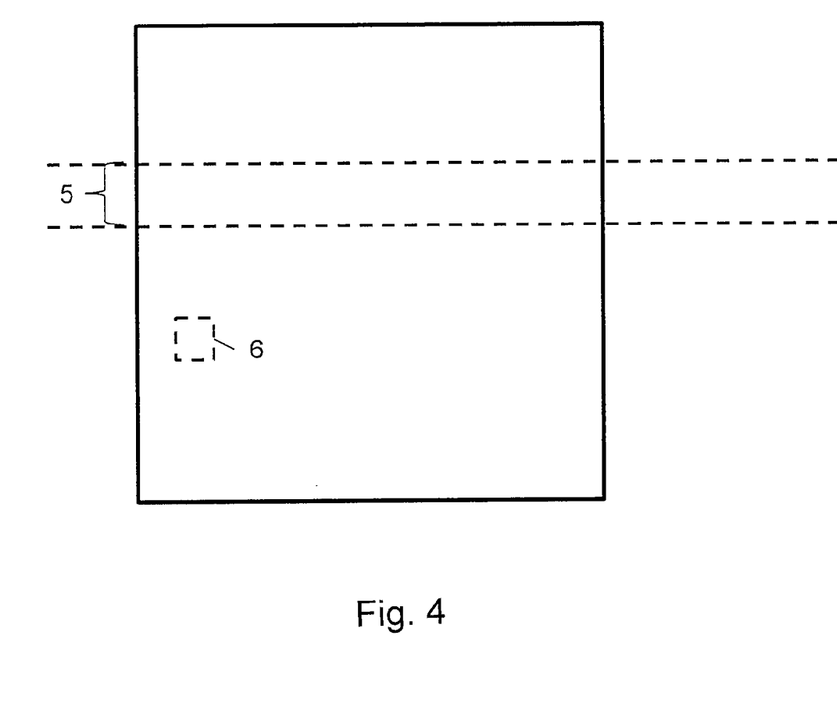
FIG. 4 is possible region of a print image of an intermediate, part or end product to be scanned.

FIG. 4 shows an exemplary view of possible print regions to be scanned. Individual tracks 5 or predetermined regions 6 of a print image of an order, or a combination thereof, for example regions in which page numbers or other characteristic features are present, can be scanned. This scan is preferentially performed in a high-resolution manner, preferably pixel-accurately since scanning the image content is desired here in order to achieve unambiguous allocation. In the example shown here the scan is performed only on one side of the intermediate, part or end product. However this is not limited. Scanning can rather be performed also on one or multiple sides.

The invention overcomes the disadvantages described at the outset by providing the method described above and a device for the markless scanning of a print image. Further advantages are the possibility to perform a quality check of the resultant product even in the production device by using a scanning device, and for example perform a completeness check or achieve detection of waste, and provide automated passing on to and processing in following logistical processes.

LIST OF REFERENCE NUMBERS

1 Printing press
2 Further processing device
3 Scanning device
4 Paper webs or paper sheets
5 Individual tracks
6 Predetermined regions The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for controlling or regulating a production process with a print form-variable production device that includes an order, wherein, for the order, product data for a production step of the production device for creating an intermediate, part or end product is stored in a storage device, comprising the steps of:
   (a) in individual tracks of a remaining print image of an intermediate, part or end product, in which remaining print image merely definable parts of a print image originally printed onto a substrate are visible, scanning the remaining print image with a scanning device after a predetermined production step of the production device;
   (b) comparing the scanned remaining print image with the product data, in the form of imaging data in combination with at least imposition schema and production structure data, for said production step of the production device for creating the intermediate, part or end product stored in the storage device, from which product data a process sequence is known, to allocate the scanned remaining print image to the order;
   (c) based on the comparing, checking of a previous processing or production step and/or calculating following control actions needed for further processing of the order allocated to the intermediate, part or end product; and
   (d) carrying out print form-variable production of the intermediate, part or end product as the following control actions with the production device.

2. The method according to claim 1, wherein the product structure data further comprises information regarding logical construction, content, personalizations of the intermediate, part or end product, logistical information, and commercial information.

3. The method according to claim 1, wherein at least one predetermined trail of the remaining print image that is still visible dependent on a respective processing step is scanned.

4. The method according to claim 1, wherein the scanning is performed on at least one side of the intermediate, part or end product.

5. The method according to claim 1, wherein the scanning takes place by a sensor.

6. The method according to claim 1, wherein the print image is scanned pixel-accurately.

7. The method according to claim 1, wherein the print image is scanned such that substantial geometrical features are scanned.

8. The method according to claim 1, wherein the print image is scanned such that a histogram regarding one or multiple predetermined features is created.

9. The method according to claim 8, wherein the one or multiple predetermined features comprises a color of white, black, blue, yellow, red and/or green.

10. The method according to claim 8, wherein the print image is scanned such that a pixel-accurate further feature is scanned.

11. The method according to claim 1, wherein the following control actions comprises process and/or logistical steps.

12. The method according to claim 1, further comprising completing the order, uniting multiple orders, qualitative or quantitative checking of the order, passing on to a following device, and tracing.

13. A print form-variable production device which performs the method according to claim 1.

14. The print form-variable production device according to claim 13, wherein the scanning device is arranged in and/or in front of and/or after a processing device.

* * * * *